United States Patent
Hatakeyama et al.

(10) Patent No.: US 11,168,642 B2
(45) Date of Patent: Nov. 9, 2021

(54) CYLINDER LINER FOR CAST-COVERING, AND METHOD FOR MANUFACTURING CYLINDER BLOCK

(71) Applicants: TPR Co., Ltd., Tokyo (JP); TPR Industry Co., Ltd., Yamagata (JP)

(72) Inventors: Koichi Hatakeyama, Yamagata (JP); Tomoki Takiguchi, Yamagata (JP); Yoshihiko Aoki, Yamagata (JP); Yuusuke Okuyama, Yamagata (JP); Mako Abe, Yamagata (JP)

(73) Assignees: TPR Co., Ltd., Tokyo (JP); TPR Industry Co., Ltd., Yamagata (JP)

( * ) Notice: Subject to any disclaimer, the term of this patent is extended or adjusted under 35 U.S.C. 154(b) by 0 days.

(21) Appl. No.: 16/979,229

(22) PCT Filed: Dec. 12, 2018

(86) PCT No.: PCT/JP2018/045644
§ 371 (c)(1),
(2) Date: Sep. 9, 2020

(87) PCT Pub. No.: WO2019/225039
PCT Pub. Date: Nov. 28, 2019

(65) Prior Publication Data
US 2020/0398336 A1    Dec. 24, 2020

(30) Foreign Application Priority Data

May 24, 2018 (JP) .............................. JP2018-099656
Oct. 30, 2018 (JP) .............................. JP2018-203418
Nov. 15, 2018 (JP) .............................. JP2018-214320

(51) Int. Cl.
*F02F 1/00* (2006.01)
*B22D 19/08* (2006.01)
(Continued)

(52) U.S. Cl.
CPC .......... *F02F 1/004* (2013.01); *B22D 19/0009* (2013.01); *B22D 19/08* (2013.01); *F16J 10/04* (2013.01); *F02F 2200/06* (2013.01)

(58) Field of Classification Search
CPC .. F02F 1/004; F02F 2200/06; B22D 19/0009; B22D 19/08; F16J 10/04
See application file for complete search history.

(56) References Cited

U.S. PATENT DOCUMENTS

2007/0009669 A1* 1/2007 Miyamoto ......... B22D 19/0009
                                                         427/446
2007/0012178 A1    1/2007 Takami et al.
(Continued)

FOREIGN PATENT DOCUMENTS

JP    2005-194983 A    7/2005
JP    2007-15005 A     1/2007
(Continued)

OTHER PUBLICATIONS

International Application No. PCT/JP2018/045644, International Search Report, dated Jan. 22, 2019.
(Continued)

*Primary Examiner* — Jacob M Amick
*Assistant Examiner* — Charles J Brauch
(74) *Attorney, Agent, or Firm* — Marshall, Gerstein & Borun LLP (57) ABSTRACT

The present invention addresses the problem of providing a cylinder liner for insert casting, with which the bonding strength between a cylinder liner and a cylinder block can be improved by reducing voids generated on the cylinder block. The problem is solved by a cylinder liner for insert casting which includes plural projections on its outer peripheral surface and satisfies the following (i) and (ii): (i) the number of the projections is 5 to 50 per 1 cm² on the outer peripheral
(Continued)

surface, and (ii) when two 15.2 mm×0.03 mm lines are set in parallel with a gap of 3.8 mm therebetween at an arbitrary position on the outer peripheral surface of the cylinder liner, the total number of projections that are in contact with the two lines is 8 or less.

8 Claims, 7 Drawing Sheets

(51) Int. Cl.
    *F16J 10/04*     (2006.01)
    *B22D 19/00*     (2006.01)

(56) References Cited

U.S. PATENT DOCUMENTS

| | | |
|---|---|---|
| 2007/0240652 A1 | 10/2007 | Michioka et al. |
| 2009/0272261 A1 | 11/2009 | Sato et al. |
| 2012/0304852 A1 | 12/2012 | Yamagata et al. |
| 2019/0358701 A1 | 11/2019 | Sayama et al. |

FOREIGN PATENT DOCUMENTS

| | | |
|---|---|---|
| JP | 2007-16733 A | 1/2007 |
| JP | 2009-264347 A | 11/2009 |
| JP | 2011-194407 A | 10/2011 |
| JP | 6340148 B1 | 6/2018 |
| WO | WO-2007/007813 A1 | 1/2007 |
| WO | WO-2007/007826 A1 | 1/2007 |
| WO | WO-2015/002289 A1 | 1/2015 |

OTHER PUBLICATIONS

Japanese Patent Application No. 2019214004, Decision to Grant, dated Apr. 21, 2020.
International Application No. PCT/JP2018/045632, International Search Report dated Jan. 22, 2019.

* cited by examiner

CYLINDER LINER FOR CAST-COVERING, AND METHOD FOR MANUFACTURING CYLINDER BLOCK

TECHNICAL FIELD

The present invention relates to a cylinder liner, particularly a cylinder liner for insert casting, which is insert-cast into a cylinder block and forms a cylinder inner peripheral wall. The present invention also relates to a method of producing a cylinder block using the cylinder liner for insert casting.

BACKGROUND ART

In the production of a cylinder block applied to an automobile engine, a cylinder liner is arranged on the inner peripheral side of a cylinder. One example of a method of producing a cylinder block having a cylinder liner arranged therein is a method in which a cylinder liner is arranged in advance in a mold for a cylinder block and a casting material is poured into the mold to insert-cast the outer periphery of the cylinder liner with the casting material.

As such a cylinder liner to be arranged in advance in a mold in the production of a cylinder block, cylinder liners which have plural projections on their outer peripheral surfaces for the purpose of improving the bonding strength with the resulting cylinder block are known (see, for example, Patent Documents 1 and 2).

Further, with regard to such plural projections on the cylinder liner outer peripheral surface, a technology for improving the bonding strength and adhesion with a cylinder block by focusing on projections having a constricted shape is known (see, for example, Patent Document 3).

RELATED ART DOCUMENTS

Patent Documents

[Patent Document 1] Japanese Unexamined Patent Application Publication No. 2005-194983
[Patent Document 2] Japanese Unexamined Patent Application Publication No. 2009-264347
[Patent Document 3] Japanese Patent No. 6340148

SUMMARY OF THE INVENTION

Problems to be Solved by the Invention

Attempts have been made to improve the bonding strength between the outer peripheral surface of a cylinder liner and a cylinder block by, as described above, forming projections on the outer peripheral surface of the cylinder liner and controlling the projections to have a constricted shape.

Meanwhile, in the cylinder block production, a cylinder block is produced by a method of pouring a casting material into a cylinder block mold in which a cylinder liner has been arranged and thereby insert-casting the outer periphery of the cylinder liner with the casting material. In this process, there are cases where the casting material poured into the mold does not sufficiently spread into the regions between projections formed on the cylinder liner outer peripheral surface. Consequently, voids are generated in the parts of the cylinder block to be bonded with the cylinder liner outer peripheral surface, and this was considered to result in an insufficient bonding strength in some cases.

An object of the present invention is to provide a cylinder liner for insert casting, with which the bonding strength between a cylinder liner and a cylinder block can be improved by reducing voids generated on the cylinder block.

Means for Solving the Problems

The present inventors intensively studied to solve the above-described problems and consequently discovered that, by appropriately adjusting gaps between plural projections existing on the outer peripheral surface of a cylinder liner, a casting material poured into a mold is allowed to also spread between the projections on the outer peripheral surface of the cylinder and the generation of voids on a cylinder block can thus be inhibited, whereby the bonding strength between the cylinder liner and the cylinder block can be improved, thereby completing the present invention.

The present invention encompasses a cylinder liner for insert casting, which includes plural projections on its outer peripheral surface and satisfies the following (i) and (ii):
 (i) the number of the projections is 5 to 50 per 1 $cm^2$ on the outer peripheral surface, and
 (ii) when two 15.2 mm×0.03 mm lines are set in parallel with a gap of 3.8 mm therebetween at an arbitrary position on the outer peripheral surface of the cylinder liner, the total number of projections that are in contact with the two lines is 8 or less.

The cylinder liner preferably further satisfies the following (iii), (iv) and/or (v):
 (iii) when an arbitrary projection A on the outer peripheral surface of the cylinder liner is selected and projections $A_n$ (wherein, n is an integer of 1 to 7) adjacent to the selected projection A are defined as projections A1, A2, A3, A4, A5, A6 and A7 in ascending order of the distance from the projection A, distances $L_n$ (mm) between the projection A and the respective projections $A_n$ satisfy the following equation:

$(L1+L2+L3+L4+L5+L6+L7)/7 \geq 1.5$ mm;

(iv) the projections have a projection area ratio S (%), which is defined as follows, of 5% to 20%:
 Projection area ratio S (%)=Ratio of a total cross-sectional area of the projections per unit area at a position of 300 μm from the base of the projections with respect to a unit area; and/or
 (v) the projections have a projection constriction ratio Pr (%), which is defined as follows, of 50% or higher:
 Projection constriction ratio Pr (%)=(Number of constricted projections per 1 $cm^2$/Number of projections per 1 $cm^2$)×100.

The present invention also compasses a method of producing a cylinder block, the method including: the step of preparing a cylinder block mold; the step of arranging a cylinder liner in the thus prepared cylinder block mold; and the step of forming a cylinder block by pouring a casting material into the cylinder block mold in which the cylinder liner has been arranged, wherein the cylinder liner satisfies the following (i) and (ii):
 (i) the number of the projections is 5 to 50 per 1 $cm^2$ on the outer peripheral surface, and
 (ii) when two 15.2 mm×0.03 mm lines are set in parallel with a gap of 3.8 mm therebetween at an arbitrary position on the outer peripheral surface of the cylinder liner, the total number of projections that are in contact with the two lines is 8 or less.

Effects of the Invention

By using the cylinder liner according to the present invention, a casting material poured into a mold is allowed to spread between projections as well, and the generation of voids on a cylinder block can thereby be inhibited, as a result of which the bonding strength between the cylinder liner and the cylinder block can be improved. Particularly, even in the case of a cylinder block produced by a gravitational casting method in which a casting material is considered unlikely to spread, the generation of voids on the cylinder block can be inhibited.

MODE FOR CARRYING OUT THE INVENTION

One embodiment of the present invention encompasses a cylinder liner for insert casting, which includes plural projections on its outer peripheral surface and satisfies the following (i) and (ii):
  (i) the number of the projections is 5 to 50 per 1 $cm^2$ on the outer peripheral surface, and
  (ii) when two 15.2 mm×0.03 mm lines are set in parallel with a gap of 3.8 mm therebetween at an arbitrary position on the outer peripheral surface of the cylinder liner, the total number of projections that are in contact with either one of the two lines is 8 or less.

In the present embodiment, the projections existing on the outer peripheral surface of the cylinder liner satisfy the above-described (i) and (ii), i.e. the number of the projections is small to some extent and adjacent projections have moderate gaps therebetween; therefore, a casting material poured into a mold can spread between the projections as well, and the generation of voids on a cylinder block can thereby be inhibited, as a result of which the bonding strength between the cylinder liner and the cylinder block can be improved. Particularly, even in a cylinder block produced by a gravitational casting method in which a casting material is considered unlikely to spread to every part, a casting material also spreads between the projections on the outer peripheral surface of the cylinder liner.

The number of the projections on the outer peripheral surface of the cylinder liner (hereinafter, also referred to as "number of projections Pn") is, as described in the above (i), usually 5 or more, preferably 10 or more, but usually 50 or less, preferably 35 or less, and may be 25 or less, 20 or less, or 19 or less, per 1 $cm^2$.

Taking into consideration the above-described requirement (ii), the number of projections Pn is preferably not excessively large, and it is usually 50 or less. Meanwhile, when the number of projections Pn is less than 5, the bonding strength tends to be insufficient.

In the present embodiment, when two 15.2 mm×0.03 mm lines are set in parallel with a gap of 3.8 mm therebetween at an arbitrary position on the outer peripheral surface of the cylinder liner, the total number of projections that are in contact with the two lines is 8 or less. The number of projections that are in contact with the lines will now be described referring to FIG. 1.

Figure 1:
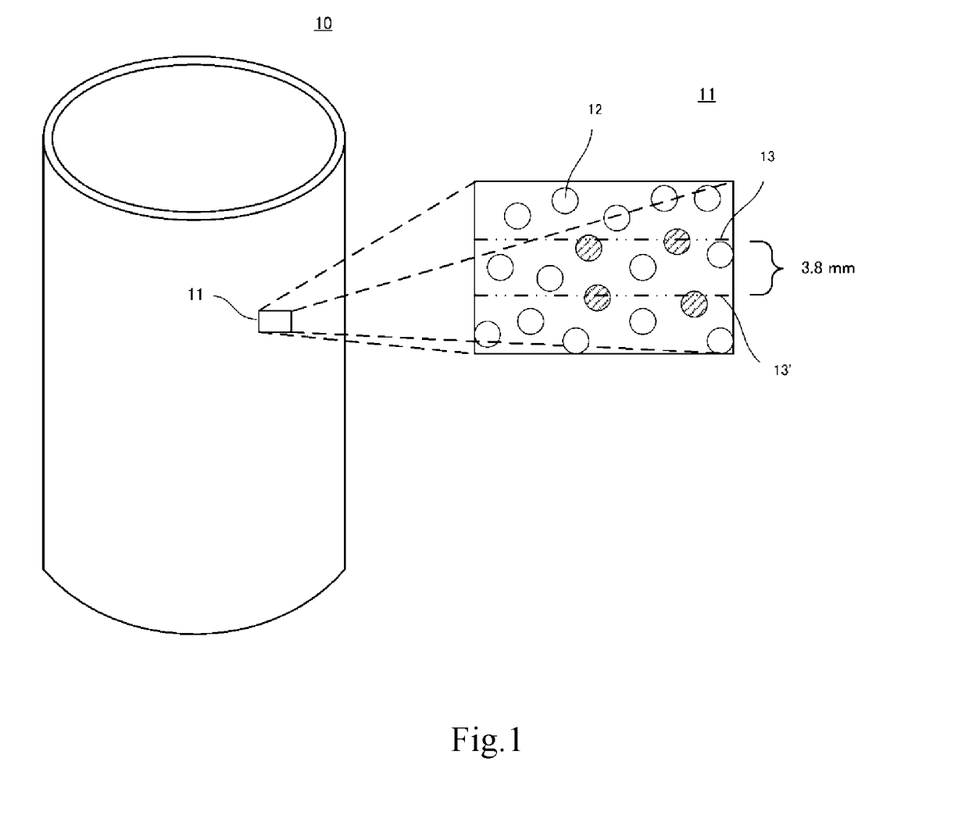
FIG. 1 provides a schematic drawing of a cylinder liner according to one embodiment, along with an enlarged schematic drawing that illustrates a part of the outer peripheral surface of the cylinder liner.

FIG. 1 provides a schematic drawing of a cylinder liner 10 according to one embodiment, along with a drawing that magnifies and schematically illustrates an outer peripheral surface 11 of the cylinder liner 10. Plural projections 12 exist randomly on the cylinder liner outer peripheral surface 11. Two lines 13 and 13' each having a length of 15.2 mm and a thickness of 0.03 mm are set in parallel with a gap of 3.8 mm therebetween at an arbitrary position on the cylinder liner outer peripheral surface, and those projections that are in contact with either one of the lines 13 and 13' (projections indicated with hatched lines in FIG. 1) are counted. The number of the counted projections increases with narrower gaps between adjacent projections, or decreases with wider gaps between adjacent projections.

The feature that the number of projections that are in contact with the two lines is 8 or less means that adjacent projections have moderate gaps therebetween and, by controlling adjacent projections to have such moderate gaps, a casting material poured into a mold is allowed to sufficiently spread between the projections, and the generation of voids on a cylinder block can thereby be inhibited, as a result of which the bonding strength between the cylinder liner and the cylinder block can be improved.

The number of projections that are in contact with the lines in the above-described requirement (ii) may be 7 or less, or 5 or less. A lower limit thereof is not restricted; however, it is usually larger than 0, and may be 1 or larger, or 2 or larger. The number of projections in the requirement (ii) is preferably determined by counting the number of projections that are in contact with the two lines at two or more spots on the same cylinder liner and calculating the average thereof.

In the present embodiment, it is preferred that the following (iii) be further satisfied:
  (iii) when an arbitrary projection A on the outer peripheral surface of the cylinder liner is selected and projections An (wherein, n is an integer of 1 to 7) adjacent to the selected projection A are defined as projections A1, A2, A3, A4, A5, A6 and A7 in ascending order of the distance from the projection A, distances Ln (mm) between the projection A and the respective projections An satisfy the following equation:

$$(L1+L2+L3+L4+L5+L6+L7)/7 \geq 1.5 \text{ mm}.$$

The equation of (iii) will now be described referring to FIG. 2.

Figure 2:
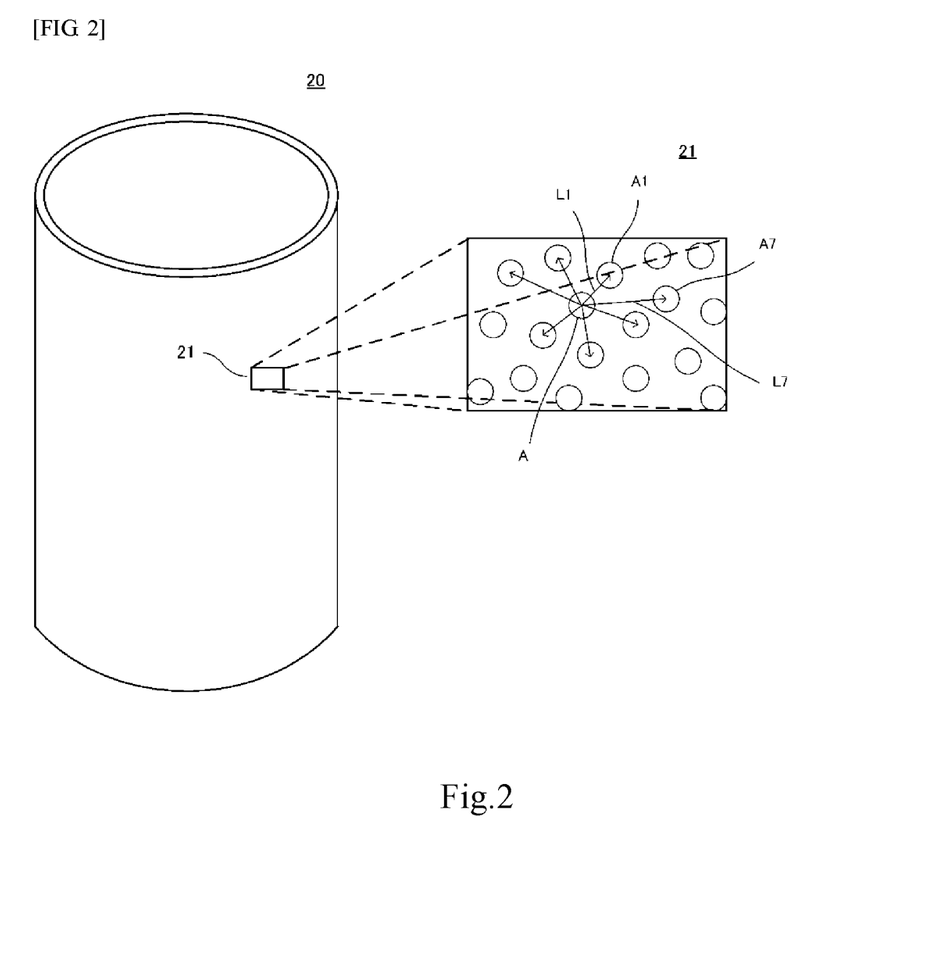
FIG. 2 provides a schematic drawing of a cylinder liner according to another embodiment, along with an enlarged schematic drawing that illustrates a part of the outer peripheral surface of the cylinder liner.

FIG. 2 provides a schematic drawing of a cylinder liner 20 according to one embodiment, along with a drawing that magnifies and schematically illustrates the outer peripheral surface of the cylinder liner 20. Plural projections exist randomly on a cylinder liner outer peripheral surface 21. When one of these projections is defined as projection A, other projections are defined as A1 to A7 in ascending order of the distance from the projection A. Further, the distance between A and each An is defined as Ln, and the weighted average of the distance Ln is calculated.

The equation of (iii) also means that adjacent projections have moderate gaps therebetween, and the weighted average of the distance Ln between projections is preferably not less than 1.5, and may be not less than 1.8, or not less than 2.0. An upper limit thereof is not restricted; however, it is usually 10 or less, and may be 5 or less, or 4 or less.

The weighted average of the distance Ln between projections in the requirement (iii) is preferably determined by measuring the weighted average at two or more spots on the same cylinder liner and calculating the average thereof.

In the present embodiment, it is preferred that the following (iv) be further satisfied:

(iv) the projections have a projection area ratio S (%), which is defined as follows, of 5% to 20%:

Projection area ratio S (%)=Ratio of a total cross-sectional area of the projections per unit area at a position of 300 μm from the base of the projections with respect to a unit area.

The above (iv) represents the number and/or the thickness of the projections, indicating that the higher the projection area ratio, the greater the number of the projections and/or the larger the thickness of the projections. In the present embodiment, by controlling the projection area ratio S in the above-described range, gaps between the projections are moderately formed, so that a casting material poured into a mold spreads between the projections as well.

Moreover, the projection thickness (S/Pn), which is determined by dividing the projection area ratio S (%) by the number of projections Pn defined in the above (i), may be 0.45 or larger, 0.5 or larger, 0.55 or larger, or 0.6 or larger, but 0.8 or smaller, 0.75 or smaller, or 0.7 or smaller. A larger value of S/Pn indicates a larger thickness of the projections, and it is preferred to satisfy the above-described range since the bonding strength between the cylinder liner and a cylinder block is thereby improved.

In the present embodiment, it is preferred that the following (v) be further satisfied:

(v) the projections have a projection constriction ratio Pr (%), which is defined as follows, of 50% or higher:

Projection constriction ratio Pr (%)=(Number of constricted projections per 1 cm$^2$/Number of projections per 1 cm$^2$)×100.

The above (v) represents the proportion of the projections having a constricted shape. A higher proportion of the projections having a constricted shape is more preferred since it leads to a further improvement in the bonding strength between the cylinder liner and a cylinder block. The projection constriction ratio Pr is preferably 50% or higher, and may be 60% or higher, 70% or higher, 75% or higher, or 80% or higher.

Figure 3:
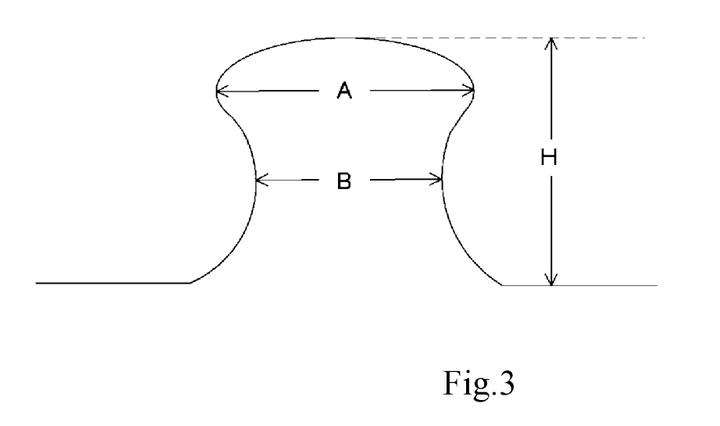
FIG. 3 is a schematic cross-sectional view of a constricted projection.
Figure 4:
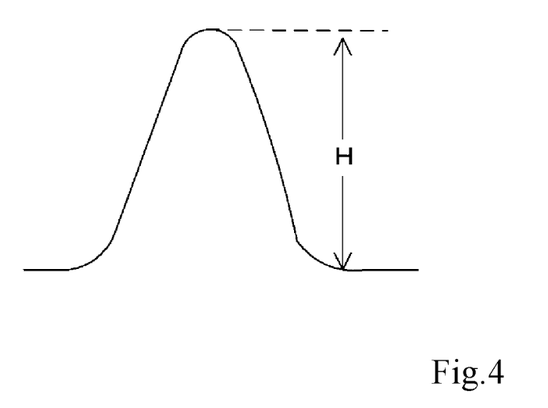
FIG. 4 is a schematic cross-sectional view of another projection with no constriction.

FIG. 3 is an enlarged schematic cross-sectional view that illustrates one example of a projection having a constricted shape. Meanwhile, FIG. 4 is an enlarged schematic cross-sectional view that illustrates one example of a projection having other shape with no constriction.

As illustrated in FIG. 3, a constricted projection has a height H from its base on the outer peripheral surface and, typically, the constricted projection has a minimum thickness B as the thickness gradually decreases in the height direction from the base surface. From this point, the thickness gradually increases in the height direction, giving the constricted projection a maximum thickness A. In the present specification, a projection which sequentially has a minimum thickness B and a maximum thickness A from its base surface along the height direction in this manner is defined as "constricted projection".

The average projection height H (mm) is not particularly restricted; however, it is usually not less than 0.25 mm, preferably not less than 0.4 mm, but usually 1.1 mm or less, preferably 0.8 mm or less. The average projection height H (mm) is determined by measuring the projection height using a dial depth gauge (minimum unit=0.01 mm) at two radially opposing spots on the respective axial ends of a cylinder member and calculating the average of the values measured at these four spots.

The number of projections Pn per 1 cm$^2$, which is prescribed in the above (i) is determined by obtaining a contour plot of the projections at a position of 300 μm from the base of the projections using a three-dimensional laser measuring device, and counting the number of projections in a part enclosed in an area of 1 cm$^2$.

Further, the projection area ratio S is determined by obtaining a contour plot of the projections at a position of 300 μm from the base of the projections using a three-dimensional laser measuring device, and calculating the ratio of a total area of the projections in a part enclosed in an area of 1 cm$^2$ with respect to a unit area (1 cm$^2$).

Moreover, the height of the projections can be determined using a dial depth gauge, and the numerical values prescribed in the above (ii) and (iii) can be measured or calculated by observing the cylinder liner surface under a microscope or an electron microscope.

A projection having a constricted shape can be assessed by observation under a microscope. More specifically, a projection on the outer peripheral surface of a cylinder member is observed from an angle of about 45° with respect to a line that extends through a center point of the cylinder member and a measurement point of the outer peripheral surface. By this observation, the maximum thickness A, the minimum thickness B and the like of the projection can be determined. It is noted here that the term "projection thickness" used herein may be rephrased as "width of the observed projection". An observation method will now be described more concretely referring to FIG. 5.

Figure 5:
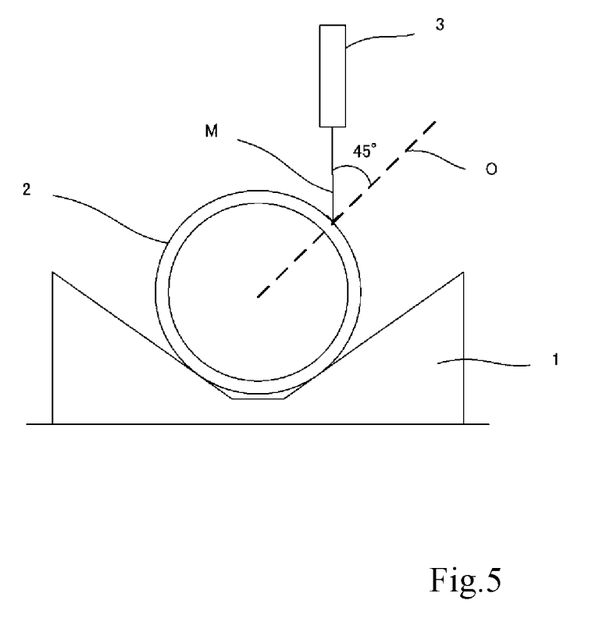
FIG. 5 is a schematic drawing that outlines the observation of projections under a microscope.

A cylinder member 2 to be evaluated is arranged on a block stand 1. A microscope 3 connected to a TV monitor (not illustrated) is arranged diagonally above the cylinder member 2 to be evaluated, such that an optical axis M of the microscope 3 is aligned parallel to the vertical direction. Projections formed on the surface of the cylinder member 2 are observed in such a manner that the optical axis M of the microscope 3 and a line 0, which extends through a center point of the cylinder member 2 and a measurement point of the outer peripheral surface, forms an angle of about 45° at an intersection of the optical axis M and the outer peripheral surface of the cylinder member 2.

One example of a method of producing the cylinder liner of the present embodiment will now be described.

The composition of a cast iron used as a material of the cylinder liner is not particularly restricted, and one typical example thereof is the following composition of flake graphite cast iron that takes into consideration the wear resistance, the seizure resistance and the workability and corresponds to JIS FC250:

C: 3.0 to 3.7% by mass,
Si: 2.0 to 2.8% by mass,
Mn: 0.5 to 1.0% by mass,
P: 0.25% by mass or less,
S: 0.15% by mass or less,
Cr: 0.5% by mass or less, and
Remainder: Fe and inevitable impurities.

A method of producing the cylinder liner is not particularly restricted; however, a centrifugal casting method is preferred, and the method typically includes the following steps A to E.

<Step A: Suspension Preparation Step>

The step A is a step of preparing a suspension by blending a refractory base material, a binder, and water at a prescribed ratio.

As the refractory base material, diatomaceous earth is typically used; however, the refractory base material is not restricted thereto. The content of diatomaceous earth in the suspension is usually 20% by mass to 35% by mass, and the average particle size of diatomaceous earth is usually 2 μm to 35 μm.

As the binder, bentonite is typically used; however, the binder is not restricted thereto. The content of bentonite in the suspension is usually 3% by mass to 9% by mass.

Further, the content of water in the suspension is usually 62% by mass to 78% by mass.

<Step B: Mold Wash Preparation Step>

The step B is a step of preparing a mold wash by adding a prescribed amount of a surfactant to the suspension prepared in the step A.

The type of the surfactant is not particularly restricted, and a known surfactant, such as a cationic surfactant, an anionic surfactant, a nonionic surfactant or an amphoteric surfactant, may be used singly, or two or more thereof may be used in combination. The amount of the surfactant(s) to be added is usually 0.005 parts by mass to 0.04 parts by mass with respect to 100 parts by mass of the suspension.

<Step C: Mold Wash Application Step>

The step C is a step of applying the mold wash onto the inner peripheral surface of a cylindrical mold used as a casting mold. An application method is not particularly restricted; however, spray coating is typically employed. When the mold wash is applied, it is preferred that the mold wash be applied in such a manner that a layer thereof is formed at a substantially uniform thickness over the entirety of the inner peripheral surface. Further, when the mold wash is applied to form a mold wash layer, it is preferred to provide a moderate centrifugal force by rotating the cylindrical mold.

The present inventors presume that projections existing on the surface of the resulting cylinder liner are formed by the following process.

That is, in the mold wash layer formed on the inner peripheral surface of the mold heated to a prescribed temperature, bubbles are generated due to rapid evaporation of water contained in the mold wash. The surfactant acts on the bubbles of a relatively large size and the bubbles of a relatively small size bind to each other, whereby recessed holes are formed on the inner peripheral side of the mold wash layer. The recessed holes are formed on the mold wash layer in the process where the mold wash layer is gradually dried from the side of the mold inner peripheral surface and thereby gradually solidified to yield the recessed holes.

The thickness of the mold wash layer is preferably selected to be in a range of 1.1 to 2.0 times the height of the projections; however, the thickness of the mold wash layer is not restricted thereto. In order to allow the mold wash layer to have such a thickness, it is preferred to control the temperature of the mold to be 300° C. or lower.

<Step D: Cast Iron Casting Step>

The step D is a step of casting cast iron into the mold which has the thus dried mold wash layer and is in a rotating state. In this step, molten cast iron is filled into the recessed holes having a constricted shape that are formed on the mold wash layer as described in the previous step, whereby constricted projections are formed on the surface of the resulting cylinder liner. Also in this process, it is preferred to apply a moderate centrifugal force.

<Step E: Demolding and Finishing Step>

The step E is a step of taking the thus produced cylinder liner out of the mold and removing the mold wash layer from the cylinder liner surface by blasting to complete the cylinder liner.

A cylinder liner is completed through the above-described steps. In order to control the number of the projections on the cylinder linear surface to be small and to control the gaps between the projections to be moderately wide, it is necessary to appropriately adjust, for example, the amount of water used in the step A, the type and the amount of the surfactant used in the step B, the thickness of the mold wash layer, the value of Gno during the formation of the mold wash layer, and the value of Gno during the casting of cast iron. Specifically, the projections on the cylinder liner surface are likely to be obtained in the desired form by adopting the followings:

Amount of water added in the step A: 65% by mass to 75% by mass

Amount of surfactant added in the step B: 0.005% by mass to 0.04% by mass

Type of surfactant used in the step B: a combination of two or more surfactants

Thickness of mold wash layer: 0.5 mm to 1.1 mm

Gno (lining): 20 G to 80 G

Gno (casting): 80 G to 160 G

It is noted here that Gno (lining) represents the centrifugal force (G) provided by rotating the cylindrical mold in the formation of the mold wash layer in the step C, and Gno (casting) represents the centrifugal force (G) provided by rotating the mold in the step D.

Another embodiment of the present invention is a method of producing a cylinder block, which method includes: a step of preparing a cylinder block mold; a step of arranging a cylinder liner in the thus prepared cylinder block mold; and a step of forming a cylinder block by pouring casting material into the cylinder block mold in which the cylinder liner has been arranged. The cylinder liner arranged in the cylinder block mold satisfies the above-described (i) and (ii).

As described above, in the production of a cylinder block particularly by a gravitational casting method, by using a cylinder liner that satisfies the above-described (i) and (ii), the generation of voids on a cylinder block can be inhibited, so that the bonding strength between the cylinder liner and the cylinder block is improved.

EXAMPLES

The present invention will now be described more concretely by way of Examples thereof; however, it is needless to say that the scope of the present invention is not restricted to the below-described Examples.

Methods of measuring the physical properties of the cylinder liners used in Examples were as follows.

<Average Height H (mm) of Projections>

The average height H (mm) of projections was determined using a dial depth gauge (minimum unit=0.01 mm). The projection height was measured at two sets of radially opposing spots on the respective axial ends of a cylinder member, and the average of the values measured at these four spots was calculated as the average height H (mm) of the projections.

<Number of Projections Pn>

The number of projections Pn was determined by obtaining a 1 cm×1 cm contour plot based on a measurement of the outer peripheral surface of a cylinder member using a noncontact-type three-dimensional laser measuring device, and subsequently counting the number of regions surrounded by a contour line indicating a height of 300 μm in the thus obtained contour plot. In the same manner as in the measurement of the projection height, the measurement was performed at two sets of radially opposing spots on the respective axial ends of the cylinder member, and the average of the values measured at these four spots was calculated the number of projections Pn per 1 cm$^2$.

<Projection Constriction Ratio Pr (%)>

The constriction ratio Pr (%) was determined by observing projections under a microscope (digital microscope KH-1300, manufactured by HIROX Co., Ltd.) to determine whether or not each projection was constricted, and subsequently dividing the number of constricted projections per 1 cm$^2$ by Pn and multiplying the thus obtained value by 100. It is noted here that the projection constriction ratio was defined as an average of the values measured at four spots.

<Projection Area Ratio S (%) and Projection Thickness (S/Pn)>

The projection area ratio S (%) was determined by obtaining a contour plot of projections at a position of 300 μm from the base of the projections using a three-dimensional laser measuring device, and calculating the ratio of a total area of the projections in a part enclosed in an area of 1 cm$^2$ with respect to a unit area (1 cm$^2$). The projection thickness (S/Pn) was determined by dividing this projection area ratio S (%) by the above-determined number of projections Pn.

<Number of Projections in Contact with Lines, and Weighted Average of Distance Between Adjacent Projections>

An image was obtained by observing the cylinder liner surface under a microscope. On this image, two 15.2 mm×0.03 mm lines were set in parallel with a gap of 3.8 mm therebetween, and the number of projections in contact with the lines was counted. Further, on another image obtained in the same manner, an arbitrary projection A was selected, the distances Ln (wherein, n is an integer of 1 to 7) between the respective projections An adjacent to the projection A were measured, and the weighted average thereof was determined. The measurement was performed at four spots on a single cylinder liner.

Experiments:

Preparation of Mold Wash

Using the raw materials shown in Table 1 below, mold washes 1 to 3 were prepared. As for the surfactant shown in Table 1, a combination of an anionic surfactant having a hydrocarbon group and an acid ester group and an ethanol amide-type nonionic surfactant was used in the mold washes 1 and 3, while a combination of an anionic surfactant having a hydrocarbon group and an acid ester group and a POE alkyl ether-type nonionic surfactant was used in the mold wash 2.

TABLE 1

| | Composition of mold wash | | | | |
| --- | --- | --- | --- | --- | --- |
| | Composition of suspension | | | | |
| Mold wash | Diatomaceous earth (% by mass) | Average particle diameter (mm) | Bentonite (% by mass) | Water (% by mass) | Surfactant (% by mass) |
| Mold wash 1 | 22 | 0.025 | 6 | Balance | 0.006 |
| Mold wash 2 | ↑ | ↑ | ↑ | Balance | ↑ |
| Mold wash 3 | ↑ | ↑ | ↑ | Balance | 0.010 |

Production of Cylinder Liners

Cylinder liners of Examples and Comparative Example were each produced by centrifugal casting using molten cast iron having the following composition. The thus obtained cast cylinder liners had the following composition:

C: 3.4% by mass,
Si: 2.4% by mass,
Mn: 0.7% by mass,
P: 0.12% by mass,
S: 0.035% by mass,
Cr: 0.25% by mass, and
Remainder: Fe and inevitable impurities Z (corresponding to JIS FC250)

Cylinder liners of Examples 1 and 2 and Comparative Example 1 were produced using the respective mold washes shown in Table 1. In both of these Examples, the temperature of the cylindrical mold in the step C was set in a range of 180° C. to 300° C., and a mold wash layer was formed with a Gno (lining) of 55 G. It is noted here, however, that the projection height was modified as appropriate by changing the thickness of the mold wash layer in each Example. Further, the step D and the subsequent process were performed under the same conditions in both Examples, except that the casting of the cast iron was performed at a Gno (casting) of 120 G. Thereafter, the inner peripheral surface of each of the thus obtained cast iron cylinder members was cut so as to adjust the thickness to be 5.5 mm.

The cast iron cylinder members obtained in this manner had the following dimensions: an outer diameter (outer diameter including the projection height) of 85 mm, an inner diameter of 74 mm (thickness: 5.5 mm), and a length of 130 mm in the axial direction. The shapes of the projections of the thus produced cylinder liners are shown in Table 2.

TABLE 2

| | Average height of projections H (mm) | Number of projections Pn (/1 cm$^2$) | Projection area ratio S (%) | Number of projections in contact with lines | Average distance between projections (mm) | Projection thickness (S/Pn) | Projection constriction ratio (%) |
| --- | --- | --- | --- | --- | --- | --- | --- |
| Example 1 | 0.59 | 29.0 | 15.8 | 6.25 | 1.88 | 0.54 | 78 |
| Example 2 | 0.56 | 15.0 | 10.1 | 3.75 | 2.52 | 0.673 | 95 |
| Comparative Example 1 | 0.55 | 60.0 | 25.0 | 16.5 | 1.34 | 0.417 | 80 |

\* the measurement was performed at two sets of radially opposing spots on the respective axial ends of the cylinder member, and the average of the values measured at these four spots was shown respectively.

Production of Cylinder Blocks

Using the cylinder liners obtained in Examples 1 and 2 and Comparative Example 1, joined bodies of each cylinder liner and a cylinder block were produced under the following conditions and, for each of the thus obtained cylinder blocks, the void area ratio and the bonding strength with the cylinder liner were evaluated.

Casting method: sand gravitational casting
Liner preheating: at 350° C. for 1 hour
Aluminum material: AC4B
Heat treatment: at 500° C. for 6 hours, and at 160° C. for 6 hours For each of the thus obtained joined bodies of the respective cylinder liners and the cylinder block, the void ratio of the cylinder block was measured by the following method:
i) Grind a sample cross-section that includes an interface between the cylinder liner and the aluminum block,
ii) Subsequently, take three photographs including the interface, and
iii) Measure the void area ratio (ratio (%) of interfacial gaps with respect to the field of view) on each of the photographs, and calculate the average of the measured values as the void area ratio.

Next, the bonding strength between the cylinder liner and the cylinder block was measured.

Using a tensile tester (manufactured by Shimadzu Corporation, universal tester: AG-5000E), either the subject cylinder member or outer peripheral member was fixed with a cramp, and a tensile force was applied to the other member in the direction perpendicular to the bonding plane of these members. The tensile force that caused detachment of these members was defined as the bonding strength.

Figure 6:
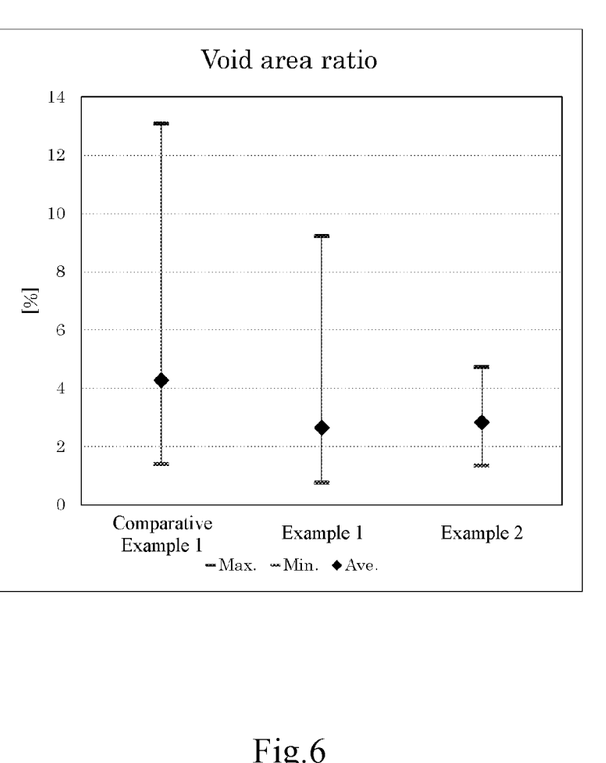
FIG. 6 shows the void area ratios of cylinder blocks which were produced using the respective cylinder liners produced in Examples and Comparative Example.
Figure 7:
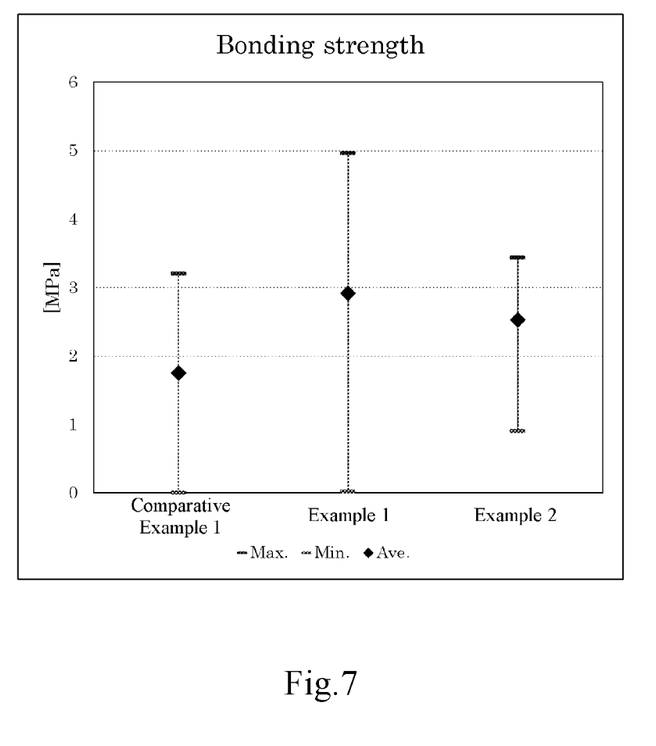
FIG. 7 shows the bonding strengths of cylinder blocks, which were produced using the respective cylinder liners produced in Examples and Comparative Example, with the cylinder liners.

The results thereof are shown in FIGS. 6 and 7. It is noted here that these results were obtained by evaluating the respective cylinder blocks produced in the same manner 15 times.

DESCRIPTION OF SYMBOLS

1: block stand
2: cylinder member
3: microscope
10, 20: cylinder liner
11, 21: cylinder liner outer peripheral surface
12: projection
13, 13': line

The invention claimed is:

1. A cylinder liner for insert casting, comprising plural projections on an outer peripheral surface and satisfying the following requirements (i) to (iii) and (vi) such that a number of said projections is small and adjacent projections have moderate gaps therebetween:
   (i) the number of the projections is in a range of $5/cm^2$ to $50/cm^2$ on the outer peripheral surface,
   (ii) when two 15.2 mm×0.03 mm lines are set in parallel with a gap of 3.8 mm therebetween at an arbitrary position on the outer peripheral surface of the cylinder liner, a total number of projections that are in contact with the two lines is 8 or less,
   (iii) when an arbitrary projection A on the outer peripheral surface of the cylinder liner is selected and projections An (wherein n is an integer of 1 to 7) adjacent to the selected projection A are defined as projections A1, A2, A3, A4, A5, A6, and A7 in ascending order of the distance from the projection A, distances Ln (mm) between the projection A and the respective projections An satisfy the following equation:

$$(L1+L2+L3+L4+L5+L6+L7)/7 \geq 1.5 \text{ mm, and}$$

(vi) the projections have a projection thickness (S/Pn) of 0.7 or less, which is determined by dividing a projection area ratio S (%), which is defined as follows, by the number of projections Pn, which is defined in (i), above: projection area ratio S (%)=ratio of a total cross-sectional area of the projections per unit area at a position of 300 μm from the base of the projections with respect to a unit area.

2. The cylinder liner according to claim 1 for manufacturing a cylinder block by a gravitational casting method.

3. The cylinder liner for insert casting according to claim 1, further satisfying the following (iv):
   (iv) the projections have a projection area ratio S (%) of 5% to 20%.

4. The cylinder liner for insert casting according to claim 1, further satisfying the following (v):
   (v) the projections have a projection constriction ratio Pr (%), which is defined as follows, of 50% or higher: projection constriction ratio Pr (%)=(number of constricted projections/$cm^2$/number of projections/$cm^2$)×100.

5. A method of producing a cylinder block, the method comprising:
   a step of preparing a cylinder block mold;
   a step of arranging a cylinder liner in the thus prepared cylinder block mold; and
   a step of forming a cylinder block by pouring casting material into the cylinder block mold in which the cylinder liner has been arranged,
   wherein the cylinder liner satisfies the following requirements (i) to (iii) and (vi) such that a number of said projections is small and adjacent projections have moderate gaps therebetween:
   (i) the number of the projections is in a range of $5/cm^2$ to $50/cm^2$ on the outer peripheral surface,
   (ii) when two 15.2 mm×0.03 mm lines are set in parallel with a gap of 3.8 mm therebetween at an arbitrary position on the outer peripheral surface of the cylinder liner, a total number of projections that are in contact with the two lines is 8 or less,
   (iii) when an arbitrary projection A on the outer peripheral surface of the cylinder liner is selected and projections An (wherein n is an integer of 1 to 7) adjacent to the selected projection A are defined as projections A1, A2, A3, A4, A5, A6, and A7 in ascending order of the distance from the projection A, distances Ln (mm) between the projection A and the respective projections An satisfy the following equation:

$$(L1+L2+L3+L4+L5+L6+L7)/7 \geq 1.5 \text{ mm, and}$$

(vi) the projections have a projection thickness (S/Pn) of 0.7 or less, which is determined by dividing a projection area ratio S (%), which is defined as follows, by the number of projections Pn, which is defined in (i), above: projection area ratio S (%)=ratio of a total cross-sectional area of the projections per unit area at a position of 300 μm from the base of the projections with respect to a unit area.

6. The method according to claim 5, wherein the cylinder liner is used for manufacturing a cylinder block by a gravitational casting method.

7. The method according to claim 5, wherein the cylinder liner further satisfies the following (iv):
- (iv) the projections have a projection area ratio S (%) of 5% to 20%.

8. The method according to claim 5, wherein the cylinder liner further satisfies the following (v):
- (v) the projections have a projection constriction ratio Pr (%), which is defined as follows, of 50% or higher: projection constriction ratio Pr (%)=(number of constricted projections/cm$^2$/number of projections/cm$^2$)× 100.

\* \* \* \* \*

UNITED STATES PATENT AND TRADEMARK OFFICE
CERTIFICATE OF CORRECTION

Page 1 of 1

PATENT NO. : 11,168,642 B2
APPLICATION NO. : 16/979229
DATED : November 9, 2021
INVENTOR(S) : Hatakeyama et al.

It is certified that error appears in the above-identified patent and that said Letters Patent is hereby corrected as shown below:

On the Title Page

Item (73), second named Applicant, "IPR Industry Co., Ltd." should be -- TPR Industry Co., Ltd. --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*